United States Patent Office 2,852,358
Patented Sept. 16, 1958

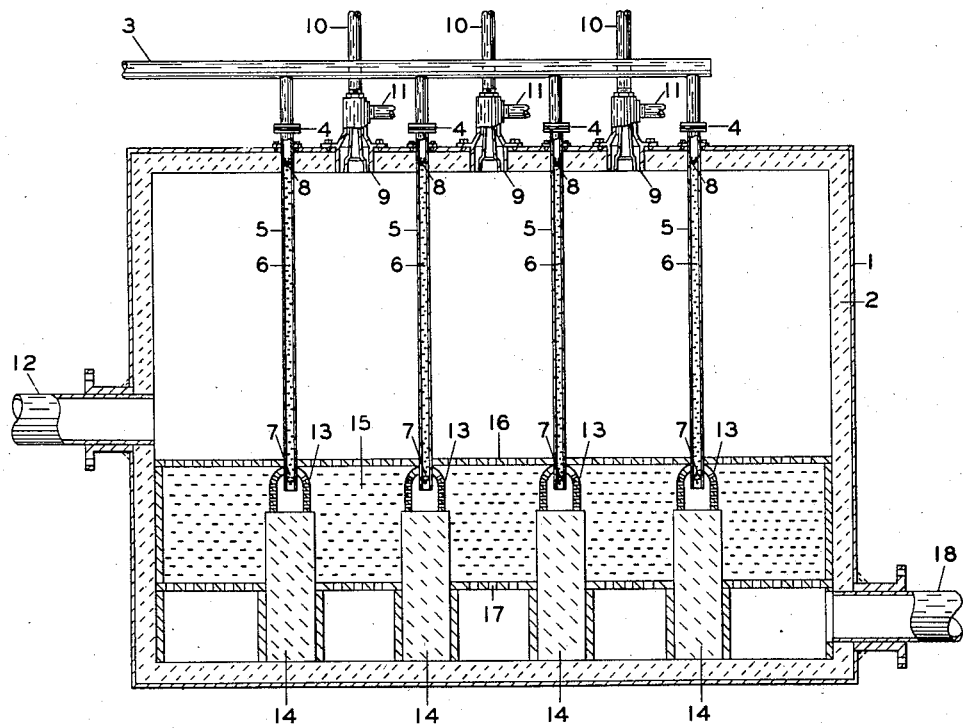

2,852,358

PROCESS FOR REFORMING HYDROCARBONS

Leonard A. Stengel, Terre Haute, Ind., assignor to Commercial Solvents Corporation, Terre Haute, Ind., a corporation of Maryland Application June 10, 1954, Serial No. 435,842

5 Claims. (Cl. 48—196)

My invention relates to a process for conducting catalytic reactions. More particularly, my invention relates to a process and apparatus for reforming hydrocarbon and steam to produce a gas rich in hydrogen, such synthesis gas being suitable for further treatment to produce methanol, ammonia, etc.

In presently available processes, hydrocarbons, such as natural gas, and steam have been reformed in an apparatus consisting essentially of a furnace having a plurality of catalyst-containing alloy tubes passing therethrough, gas fires being maintained inside of the furnace to heat the catalyst tubes. In such apparatus a mixture of natural gas and steam is passed to the top of the catalyst tubes and thence through the catalyst, which is heated to temperatures of the order of 1200–1500° F., to produce a mixture of gases consisting essentially of carbon monoxide, carbon dioxide, hydrogen, and residual methane. Each of the catalyst tubes terminates in a suitable header and manifold arrangement so that the reformed gas can be passed from the primary reforming furnace. When ammonia is the desired product, the reformed gas is passed to a secondary reformer consisting of a container filled with catalyst. In addition to the reformed gas, air is introduced to the secondary reformer to provide the nitrogen in the correct molar ratio for subsequent reaction with the hydrogen to produce ammonia. Secondary reformation is not necessary when methanol is the desired product since methanol is formed from the hydrogen and carbon oxides in the primary reformer gas. Because of the very high temperatures required in the primary reformer, the catalyst tubes are subjected to considerable expansion and contraction depending on whether the furnace is being heated up or cooled down. The catalyst tubes sometimes expand as much as six inches in length. Because of this expansion, it is extremely difficult to connect the plurality of such tubes to a header with a connection that will withstand the stresses of such expansion and contraction without developing leaks and allowing the reformed gas to escape.

An object of my invention is to provide a synthesis gas rich in hydrogen. Another object of my invention is to provide synthesis gas for ammonia or methanol production.

A further object of my invention is to provide an apparatus for reforming hydrocarbon and steam wherein one end of the catalyst tubes is free and unconnected to a header of any sort and thus able to expand and contract freely.

A still further object of my invention is to provide an apparatus for reforming hydrocarbon and steam which apparatus provides means for initially reforming the hydrocarbon and steam and also accomplishing the secondary reformation without the necessity of passing the initially reformed gases to a second apparatus where the source of nitrogen is added to the initially reformed gas.

I have now found that very efficient reformation of hydrocarbon and steam, including the secondary reformation when ammonia is the desired product and nitrogen is added to the reformed gas mixture, can be accomplished by passing the mixture of hydrocarbon and steam through a plurality of heated catalyst tubes which terminate in a bed of the catalyst, utilizing the flue gas products of combustion from the gas fired burners employed to heat the catalyst tubes as a source of nitrogen and thus effecting the secondary reformation in the catalyst bed in the bottom of the furnace without the necessity of conducting the initially reformed gases to a secondary reformer as is done in the presently known processes for production of ammonia synthesis gas described above. I can also reform hydrocarbon and steam to form gas suitable for methanol production or production of any other material requiring a synthesis gas rich in hydrogen and carbon monoxide by merely eliminating the step of mixing the reformed hydrocarbon and steam with a source of nitrogen in the process as described above.

In the drawing, the figure illustrates schematically a vertical section of a reformer suitable for reforming hydrocarbon and steam, and adapted for carrying out my invention.

The reformer consists of a furnace 1 having refactory lined walls 2 throughout. A mixture of gases to be reformed is brought to the furnace through line 3 which inlet line 3 is connected to a plurality of catalyst tubes 5 through the branch inlet lines 4. The alloy catalyst tubes 5 are filled with reformer catalyst 6, the catalyst being retained in position in the alloy tubes by the catalyst retaining screens 7 and 8 at the bottom and top of the catalyst tubes respectively. The furnace and catalyst tubes are directly heated by gas burners 9 having a gas inlet 10 and an air inlet 11. The flue gases, combustion products from the gas burners, can be withdrawn through flue gas exit 12. The bottoms of the alloy catalyst tubes are slidably projected into catalyst tube guides 13 which are perforated to allow free exit of the gases from the tubes. Thus the catalyst tubes are free to expand and contract since they are slidably connected at the lower end rather than being in fixed relation at both ends thus requiring a complicated system to compensate for the expansion and contraction of the tubes as they are heated or cooled as the case may be. The catalyst tube guides 13 are supported by refractory columns 14 which are built up from the base of the furnace. A secondary bed of additional reformer catalyst 15 is placed in the furnace at the bottom and held in positon by the retaining grates 16 and 17 at the top and bottom respectively, the bed of catalyst being high enough to cover the catalyst tube guides. The upper retaining grate 16 can be eliminated if preferred. The level of the catalyst bed 15 is thus above the lower end of the catalyst tubes 5, the secondary catalyst bed freely communicating with the portion of the furnace containing the direct heated catalyst tubes. The reformed gases are withdrawn from the furnace through the line 18.

In the operation of my process to reform gases suitable for ammonia production, I pass a mixture of hydrocarbon, preferably natural gas, and steam to the furnace through line 3 and through lines 4 to the catalyst tubes 5 containing the catalyst 6. I prefer to employ an excess amount of steam over that theoretically required. The furnace is heated by means of the gas fired burners 9 to a temperature ranging from about 1200 to 2000° F. with the preferred exit gas temperature being about 1500° F. Suitable catalysts which can be employed in the reforming operation must possess high activity and physical strength since it is obvious that the catalyst is subjected to considerable strain resulting from the high temperatures employed. Iron oxides or oxides of other metals of the iron group, along with aluminum oxide can be used as catalyst. However, a particularly suitable catalyst and one which I prefer is a nickel catalyst consisting of precipitated nickel formed into briquettes, Raschig rings, cubes, etc. or nickel deposited on refractory material such as magnesia, silica, alundum, etc.

Contact of the mixture of hydrocarbon and steam with the catalyst at the temperatures employed results in a mixture of gases having the following approximate composition:

| | Percent |
|---|---|
| Carbon monoxide | 12 |
| Carbon dioxide | 10 |
| Hydrogen | 76 |
| Residual hydrocarbon | 2 |

The reformed gases having the above approximate composition issue from the catalyst tubes 6 and pass through the perforated catalyst tube guides 13 into the secondary bed of catalyst 15. This bed of catalyst can be made up of any of the catalysts mentioned above; however, I prefer, for obvious reasons, to employ the same catalyst material both in the catalyst tubes and in the catalyst bed in the furnace. The reformed gases passing into the secondary catalyst bed are mixed with flue gas made up of the products of combustion from the gas fired burners 9. The flue gas is a source of nitrogen which is needed for ammonia production and a source of oxygen providing more heat for the secondary reformation. The mixture passes down through the catalyst bed and out of the furnace through line 18, the gaseous products of this secondary reformation having the following approximate composition:

| | Percent |
|---|---|
| Carbon monoxide | 11 |
| Carbon dioxide | 9.2 |
| Hydrogen | 58.4 |
| Nitrogen | 21.2 |
| Residual hydrocarbon | 0.2 |

The gaseous product of the secondary reformation thus contains hydrogen and nitrogen in approximately the required ratio for ammonia production. The reformed gases are then treated according to conventional processes to remove the carbon monoxide and carbon dioxide, leaving a gas mixture consisting essentially of nitrogen and hydrogen with some inert residual hydrocarbon which is then reacted in a conventional ammonia converter to produce the desired ammonia product.

As indicated above, the reformed gases issuing from the alloy catalyst tubes are mixed with flue gas as a source of nitrogen. As is clearly apparent, the desired amount of nitrogen is such as to give a final ratio of hydrogen to nitrogen which is favorable for ammonium production. Thus only a portion of the flue gases are needed for mixture with the reformed gases issuing from the alloy catalyst tubes. Since the furnace is shown with a flue gas exit 12 and a final reformed gas exit 18, it is evident that means must be provided for abstracting a portion of the flue gases for mixture with the reformed gases issuing from the catalyst tubes for exit through line 18, the remainder of the flue gases passing through line 12. I have found that I can correctly proportion the amount of flue gas in the final reformed gas mixture by controlling the relative pressures of the reformed gases in the secondary bed of reforming catalyst and of the flue gases in the portion of the furnace containing the catalyst tubes. Thus I can operate the furnace under a positive gas pressure for the system beginning at the inlet line 3 and on through outlet line 18 to the remainder of the installation for the complete production of ammonia. With this arrangement, it would be expected that all of the gases including all of the flue gas would be carried through the furnace and exit through line 18. I can then remove from the furnace through line 12 by a pressure release system, that portion of the flue gas which is not necessary for mixture with the reformer gas to produce a mixture having the correct proportions of nitrogen and hydrogen for ammonia production. I prefer, however, to control the amount of flue gas which is mixed with the reformer gas by utilizing compressors which are necessary in the ammonia synthesis system for compressing the final mixture of nitrogen and hydrogen just prior to the actual formation of ammonia. By knowing the gas inlet rate through line 3, and the corresponding gas rate issuing from the alloy tubes 5, I can adjust the compressors to pull gas at a rate such that the compressors must, of necessity, pull a quantity of the flue gas from the reformer furnace to make up the difference between the compressor rate and the rate of flow of gas from the alloy tubes corresponding to the gas inlet rate through line 3 to the reformer furnace. By so adjusting the compressor rate, I am able to pull the correct proportion of flue gas into the reformer gas mixture in order to provide the correct proportion of nitrogen for eventual combination with the hydrogen present to produce the desired ammonia.

As indicated above, I can also operate my new process and apparatus for the production of reformer gas suitable for the eventual synthesis of methanol. In this instance, I operate the process exactly as described above except that I do not use as much excess steam as for ammonia synthesis gas production and I do not mix the reformed gases issuing from the alloy catalyst tubes with flue gas since nitrogen is not needed for methanol production. I merely pass the gas products from the catalyst tubes through the catalyst bed and out of the furnace through line 18, permitting all of the flue gas to be withdrawn through flue gas exit 12. Contact of the mixture of hydrocarbon and steam with the catalyst thus results in a mixture of gases having the following approximate composition:

| | Percent |
|---|---|
| Carbon monoxide | 24.9 |
| Carbon dioxide | 5.7 |
| Hydrogen | 69.2 |
| Residual hydrocarbon | 0.2 |

I can also operate my new process for the production of synthesis gas for use in such processes as the oxo process for production of higher alcohols and aldehydes, processes involving the Fischer-Tropsch reaction, and processes for production of synthetic fuels. In such instances, I adjust the amount of steam employed to give the proper proportions of hydrogen and carbon monoxide adding carbon dioxide to the reformer with the hydrocarbon and steam if desired to increase the proportion of carbon monoxide in the reformed gas.

I wish to point out specifically that my apparatus is not limited to any particular size, furnaces containing as many as several hundred catalyst tubes being well known to the art. The alloy catalyst tubes can be arranged in rows in which case the alloy tube guides can rest on refractory walls extending throughout the length of the furnace or any other convenient arrangement can be employed. The number of gas fired burners employed would depend on the number of alloy catalyst tubes employed, the number of burners used being sufficient to heat all of the catalyst tubes uniformly to the required temperature. It is also apparent that I can allow the catalyst bed in the furnace to rest on the floor of the furnace in which case I would provide a catalyst retaining screen over the reformer gas exit 18, care being taken to insure a free flow of gases through the furnace.

I can also arrange the apparatus such that the catalyst bed instead of being in the reformer furnace itself, is positioned in a separate vessel, the gases being passed out of the furnace and through the catalyst in the separate vessel prior to being conducted to the gas purification system for removal of carbon oxides. Further, I can invert my apparatus such that the catalyst tubes are fixed at the bottom and extend up into the catalyst bed suspended in the upper portion of the furnace, thus partially alleviating the stress in the tubes caused by their being suspended from the top while undergoing expansion and contraction as the furnace is heated up or cooled down. Generally, I do not wish to be limited to the exact apparatus or process described but rather I intend to include all equivalents obvious to those skilled in the art within the scope of my invention as described in this specification and the attached claims.

Now having disclosed my invention, what I claim is:

1. A process for reforming hydrocarbon gases which comprises contacting a normally gaseous hydrocarbon and steam with reforming catalyst in direct heated catalyst tubes in a reforming furnace at a temperature ranging from 1200 to 2000° F., passing the reformed gases from the tubes through a bed of reforming catalyst, the said bed having the reforming catalyst tubes projected therein and said bed freely communicating with the portion of the said reforming furnace containing the direct heated reforming catalyst tubes, controlling the mixing of any amount of the flue gases used to heat the said catalyst tubes with the said reformed gases, and withdrawing the normally gaseous product from the furnace.

2. A process for reforming hydrocarbon gases for the production of a mixture of gases rich in hydrogen which comprises contacting a normally gaseous hydrocarbon and steam with reforming catalyst in direct heated catalyst tubes in a reforming furnace at a temperature ranging from 1200 to 2000° F., said tubes being projected into a bed of reforming catalyst, contacting the said gases with the catalyst in the secondary bed of reforming catalyst, controlling the mixing of any amount of the flue gases used to heat the said catalyst tubes with the said reformed gases by controlling the relative pressures of the said reformed gases within the said bed of secondary reforming catalyst, and the said flue gases within the portion of the vessel containing the said catalyst tubes, and withdrawing the said reformed normally gaseous product and the desired portion of the flue gases mixed therewith from the furnace.

3. A process for reforming hydrocarbon gases which comprises contacting a normally gaseous hydrocarbon and steam with a reforming catalyst in direct heated catalyst tubes in a reforming furnace at a temperature ranging from 1200 to 2000° F., said tubes projecting into a secondary bed of the reforming catalyst, contacting the said gases with the bed of reforming catalyst, both operations being conducted in a single multi-purpose reforming vessel and withdrawing the said reformed normally gaseous product from the furnace.

4. A process for reforming hydrocarbon gases which comprises contacting a normally gaseous hydrocarbon and steam and any desired proportion of carbon dioxide with reforming catalyst in direct heated catalyst tubes in a reforming furnace at a temperature ranging from 1200 to 2000° F., passing the reformed gases from the tubes through a bed of reforming catalyst, the said bed having the reforming catalyst tubes projected therein and said bed freely communicating with the portion of the said reforming furnace containing the direct heated reforming catalyst tubes, controlling the mixing of any amount of the flue gases used to heat the said catalyst tubes with the said reformed gases, and withdrawing the normally gaseous product from the furnace.

5. A process for reforming hydrocarbon gases for the production of a mixture of gases rich in hydrogen and carbon monoxide which comprises contacting a normally gaseous hydrocarbon, steam and carbon dioxide with reforming catalyst in direct heated catalyst tubes in a reforming furnace at a temperature ranging from 1200 to 2000° F., said tubes being projected into a bed of reforming catalyst, said bed freely communicating with the portion of the said reforming furnace containing the direct heated catalyst tubes, and withdrawing the reformed normally gaseous product from the furnace.

References Cited in the file of this patent

UNITED STATES PATENTS

| | | |
|---|---|---|
| 1,900,857 | Berry et al. | Mar. 7, 1933 |
| 1,917,716 | Jaeger | July 11, 1933 |
| 1,929,665 | Wilcox | Oct. 10, 1933 |
| 2,173,984 | Shapleigh | Sept. 26, 1939 |
| 2,526,521 | Voorhies | Oct. 17, 1950 |
| 2,665,979 | Taussig | June 12, 1954 |
| 2,692,193 | Riesz et al. | Oct. 19, 1954 |
| 2,700,598 | Odell | Jan. 25, 1955 |